United States Patent

Sato et al.

(10) Patent No.: US 9,459,376 B2
(45) Date of Patent: Oct. 4, 2016

(54) OPTICAL POLYMER AND OPTICAL ELEMENT OBTAINED BY FORMING THEREOF

(71) Applicant: ZEON CORPORATION, Tokyo (JP)

(72) Inventors: Ayumi Sato, Tokyo (JP); Yosuke Harauchi, Tokyo (JP); Hiroya Nishioka, Tokyo (JP); Takashi Houkawa, Tokyo (JP); Kenji Umeda, Tokyo (JP); Takuya Komatsubara, Tokyo (JP)

(73) Assignee: ZEON CORPORATION, Tokyo (JP)

( * ) Notice: Subject to any disclaimer, the term of this patent is extended or adjusted under 35 U.S.C. 154(b) by 0 days.

(21) Appl. No.: 14/655,551

(22) PCT Filed: Dec. 17, 2013

(86) PCT No.: PCT/JP2013/083704
§ 371 (c)(1),
(2) Date: Jun. 25, 2015

(87) PCT Pub. No.: WO2014/103788
PCT Pub. Date: Jul. 3, 2014

(65) Prior Publication Data
US 2015/0346386 A1    Dec. 3, 2015

(30) Foreign Application Priority Data

Dec. 25, 2012  (JP) ................... 2012-281016
Mar. 19, 2013  (JP) ................... 2013-055854
Jul. 24, 2013  (JP) ................... 2013-153122

(51) Int. Cl.
*G02B 1/04*    (2006.01)
*G02B 13/00*   (2006.01)
*C08G 61/08*   (2006.01)
*C08F 232/08*  (2006.01)
*B29D 11/00*   (2006.01)
*B29C 45/00*   (2006.01)

(52) U.S. Cl.
CPC ............. *G02B 1/041* (2013.01); *C08F 232/08* (2013.01); *C08G 61/08* (2013.01); *G02B 13/0015* (2013.01); *C08G 2261/3324* (2013.01); *C08G 2261/418* (2013.01)

(58) Field of Classification Search
CPC .. G02B 1/041; G02B 13/0015; C08G 61/08; C08G 2261/3324; C08G 2261/418; C08F 232/08; B29D 11/00
USPC ........................................................ 526/280
See application file for complete search history.

(56) References Cited

FOREIGN PATENT DOCUMENTS

JP    2007070009 A    3/2007
JP    2007-270009 A * 10/2007

(Continued)

OTHER PUBLICATIONS

Machine translation of JP 2007-270009A; publication date: Oct. 2007.*

(Continued)

*Primary Examiner* — Fred M Teskin
(74) *Attorney, Agent, or Firm* — Oliff PLC

(57) ABSTRACT

An optical polymer satisfying an expression: $(\eta A - \eta B)/\eta B \times 100 < 60$, where, $\eta A$ is the melt viscosity of the optical polymer measured at a temperature of 290° C. and a shear rate of 200 (1/s), and $\eta B$ is the melt viscosity of the optical polymer measured at a temperature of 290° C. and a shear rate of 2000 (1/s).

10 Claims, 2 Drawing Sheets

(56) References Cited

FOREIGN PATENT DOCUMENTS

| | | |
|---|---|---|
| JP | 2008013604 A | 1/2008 |
| JP | 2009138111 A | 6/2009 |
| JP | 2010150443 A | 7/2010 |
| JP | 2012057122 A | 3/2012 |

OTHER PUBLICATIONS

Jun. 30, 2015 International Preliminary Report on Patentability issued in International Patent Application No. PCT/JP2013/083704.
Apr. 8, 2014 International Search Report issued in International Application No. PCT/JP2013/083704.

* cited by examiner

OPTICAL POLYMER AND OPTICAL ELEMENT OBTAINED BY FORMING THEREOF

TECHNICAL FIELD

The present invention relates to an optical polymer that is used to form (mold) an optical element that has a small thickness and a large optically effective area (i.e., rarely produces optical defects). Note that the term "optically effective area" used herein refers to an optically effective area with respect to the entire lens when the optical element is a lens, for example.

BACKGROUND ART

Electronic/electrical devices have been reduced in weight, size, and thickness along with the recent development of electronic technology. In particular, a camera unit that is incorporated in a mobile phone and the like has been reduced in thickness and size, and required to exhibit improved F-number characteristics and modulation transfer function (MTF) characteristics. Therefore, an optical lens that is used for such a camera unit has been required to have a reduced thickness and a complex shape. Accordingly, such an optical lens has been designed to have a non-uniform thickness (i.e., have a thin part and a thick part) instead of a uniform thickness.

It has been desired to produce such an optical lens using an injection molding method that can reduce the production cost and is suitable for mass production. A lens having a diameter of less than 1 cm normally has a large optically effective area. However, it is difficult to increase the optically effective area when producing a lens by injection molding since a weld line occurs, or birefringence becomes non-uniform.

Patent Document 1 discloses a method that produces a small and thin lens by injection molding using a composition that includes a norbornene-based polymer and wax. In this case, however, the wax may bleed out from the surface of the resulting formed article (lens), and contaminate the mold, for example. Patent Document 2 discloses that a polymer that has a specific monomer composition exhibits an excellent thin article-forming capability, and produces a small and thin lens that exhibits optical properties and heat resistance in a well-balanced manner.

Patent Document 3 discloses that a polymer (norbornene-based ring-opening copolymer) obtained by subjecting a norbornene-based monomer to ring-opening polymerization in the presence of a linear α-olefin having 14 to 40 carbon atoms produces a film that exhibits water vapor barrier properties, transparency, and heat resistance in a well-balanced manner, and is suitable as a packaging material or an electronic device-sealing material.

RELATED-ART DOCUMENT

Patent Document

Patent Document 1: JP-A-2009-138111
Patent Document 2: JP-A-2010-150443
Patent Document 3: JP-A-2012-57122

SUMMARY OF THE INVENTION

Technical Problem

An object of the invention is to provide an optical polymer that is used to form a thin optical element that has a non-uniform thickness and a large optically effective area (i.e., rarely produces optical defects).

The inventors of the invention produced a thin lens having a small diameter by injection molding using the polymer that is disclosed in Patent Document 2 as being suitable as an optical material that exhibits an excellent thin article-forming capability. However, the resulting optical lens had a small optically effective area since birefringence increased around the gate, and a weld line occurred on the side opposite to the gate (i.e., optical defects occurred).

An injection molding method normally includes (1) an injection step that fills the cavity of a mold with a molten resin, (2) a dwelling step that applies pressure to the inside of the cavity until the gate is sealed, and injects the resin in an amount corresponding to the amount of the molten resin (injected in the injection step) that has been cooled and has shrunk upon contact with the mold, and (3) a cooling step that holds the resulting formed article after releasing the pressure until the resin is cooled.

An increase in birefringence around the gate occurs when orientation of the polymer molecules has occurred as a result of injecting the molten resin in the dwelling step while applying a high pressure in a state in which the viscosity of the molten resin has increased.

The term "weld line" used herein refers to a line that occurs at the interface between two or more flow fronts of a resin that has been injected into the mold in the injection step. It has been generally considered that a weld line may occur depending on the fluidity of the flow front. A weld line may be suppressed by increasing the fluidity of the resin. Since the optically effective area decreases when a long weld line has occurred, it is necessary to suppress a weld line when producing a small and thin optical lens. The inventors formed thin lenses having a non-uniform thickness using polymers that differ in fluidity, and found that a weld line having an identical length was formed even when the polymers that differ in fluidity were used.

The inventors conducted extensive studies, and found that a polymer having a specific melt viscosity pattern can suppress occurrence of a weld line and optical defects when used to form a thin lens having a non-uniform thickness. This finding has led to the completion of the invention.

The inventors conducted further extensive studies in order to increase the optically effective area with respect to the entire lens (having a small size and a small thickness), and found that birefringence around the gate can be specifically reduced by forming an optical lens by injection molding using the norbornene-based polymer disclosed in Patent Document 3. This effect is not limited to a lens having a small size and a small thickness, but is also obtained when producing other optical elements by injection molding.

A silver streak is normally suppressed by improving the working environment, and adjusting the forming conditions (e.g., by sufficiently drying resin pellets or a formed article, or preventing production of a volatile decomposition gas). The inventors conducted studies, and found that occurrence of silver streaks in the resulting formed article can be suppressed by employing a method that successively adds a polymerizable monomer and an α-olefin having 14 to 40 carbon atoms to the reaction system.

Solution to Problem

According to one aspect of the invention, an optical polymer satisfies the following expression (1).

$$(\eta A - \eta B)/\eta B \times 100 < 60 \tag{1}$$

where, ηA is the melt viscosity of the optical polymer measured at a temperature of 290° C. and a shear rate of 200 (l/s), and ηB is the melt viscosity of the optical polymer measured at a temperature of 290° C. and a shear rate of 2000 (l/s).

The optical polymer according to one aspect of the invention may be a norbornene-based polymer.

The norbornene-based polymer may have a glass transition temperature of 100 to 160° C.

The norbornene-based polymer may include a structural unit derived from an α-olefin having 14 to 40 carbon atoms at the molecular terminal thereof.

The norbornene-based polymer may be a norbornene-based polymer obtained by polymerizing a norbornene monomer in the presence of an α-olefin having 14 to 40 carbon atoms.

The norbornene-based polymer may be obtained by successively adding a polymerizable monomer that includes a norbornene monomer, and an α-olefin having 14 to 40 carbon atoms to a solvent that includes at least a polymerization catalyst.

According to another aspect of the invention, an optical element is obtained by forming the optical polymer, The optical element may be an optical lens.

Advantageous Effects of the Invention

The optical element obtained by forming the optical polymer according to one aspect of the invention has a large optically effective area (i.e., rarely produces optical defects), and is preferable as an optical lens, and more preferably a thin optical lens that has a small diameter and a non-uniform thickness. Therefore, the optical element is optimum as a mobile phone camera lens.

DESCRIPTION OF EMBODIMENTS

Figure 1:
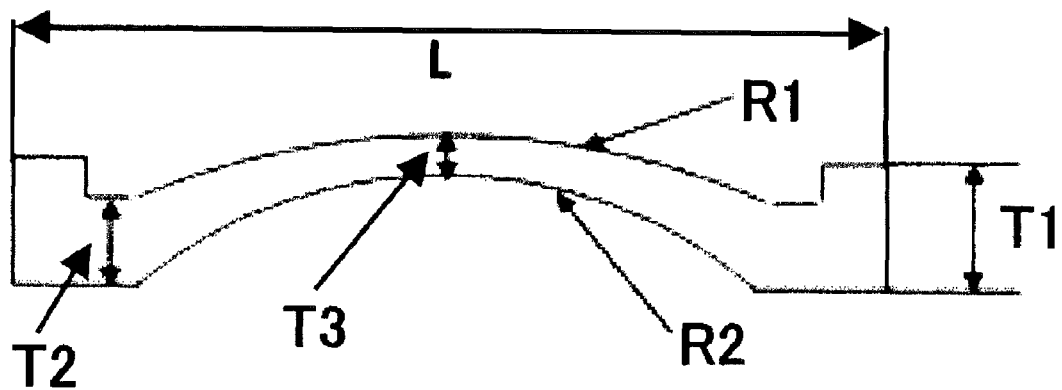
FIG. 1 illustrates a lens in which R1>R2.

An optical polymer according to one embodiment of the invention has a specific melt viscosity pattern.
(1) Optical Polymer The optical polymer has a value calculated by $(\eta A-\eta B)/\eta B \times 100$ (where, ηA is the melt viscosity of the optical polymer measured at a temperature of 290° C. and a shear rate of 200 (l/s), and ηB is the melt viscosity of the optical polymer measured at a temperature of 290° C. and a shear rate of 2000 (l/s)) of less than 60, preferably less than 50, and more preferably less than 40. It is preferable that the value calculated by $(\eta A-\eta B)/\eta B \times 100$ be close to 0. If the value calculated by $(\eta A-\eta B)/\eta B \times 100$ is large, the shear rate dependence of the melt viscosity may increase (i.e., the slope of the flow curve may increase), and a weld line may occur on the side opposite to the gate when forming (molding) a thin lens.

The type of the optical polymer is not particularly limited as long as the optical polymer exhibits transparency. Examples of the optical polymer include a polycarbonate resin, an acrylic resin, a polystyrene-based resin, a norbornene-based polymer, and the like.

Among these, the norbornene-based polymer is preferable since the norbornene-based polymer exhibits excellent heat resistance, excellent transparency, low water absorption, and low birefringence.
(2) Norbornene-based Polymer The term "norbornene-based polymer" used herein refers to a polymer obtained by polymerizing a norbornene monomer (i.e., a monomer that includes a norbornene skeleton). The norbornene-based polymers are roughly classified into a norbornene-based polymer obtained by ring-opening polymerization and a norbornene-based polymer obtained by addition polymerization.

A polymerizable monomer that includes the norbornene monomer may include only the norbornene monomer, or may be a mixture that includes the norbornene monomer and a monomer that can undergo ring-opening or addition copolymerization with the norbornene monomer.

Examples of the norbornene-based polymer obtained by ring-opening polymerization include a ring-opening polymer of the norbornene monomer, a ring-opening polymer of the norbornene monomer and a monomer that can undergo ring-opening copolymerization with the norbornene monomer, hydrogenated products thereof, and the like.

Examples of the norbornene-based polymer obtained by addition polymerization include an addition polymer of the norbornene monomer, an addition polymer of the norbornene monomer and a monomer that can undergo addition copolymerization with the norbornene monomer, and the like. Among these, a hydrogenated ring-opening polymer of the norbornene monomer and an addition polymer of the norbornene monomer are preferable from the viewpoint of heat resistance, mechanical strength, and the like.
Norbornene Monomer Examples of the norbornene monomer include a tetracyclododecene-based monomer, a norbornene-based monomer, a dicyclopentadiene-based monomer, a methanotetrahydrofluorene-based monomer, and the like.

Examples of the tetracyclododecene-based monomer include tetracyclo[4.4.0.1$^{2,5}$.1$^{7,10}$]-3-dodecene (tetracyclododecene), tetracyclo[4.4.0.1$^{2,5}$.1$^{7,10}$]-3-dodecene, 8-methyltetracyclo[4.4.0.1$^{2,5}$.1$^{7,10}$]-3-dodecene, 8-ethyltetracyclo[4.4.0.1$^{2,5}$.1$^{7,10}$]-3-dodecene, 8-ethylidenetetracyclo[4.4.0.1$^{2,5}$.1$^{7,10}$]-3-dodecene, 8,9-dimethyltetracyclo[4.4.0.1$^{2,5}$.1$^{7,10}$]-3-dodecene, 8-ethyl-9-methyltetracyclo[4.4.0.1$^{2,5}$.1$^{7,10}$]-3-dodecene, 8-ethylidene-9-methyltetracyclo[4.4.0.1$^{2,5}$.1$^{7,10}$]-3-dodecene, 8-methyl-8-carboxymethyltetracyclo[4.4.0.1$^{2,5}$.1$^{7,10}$]-3-dodecene, and the like.

Examples of the norbornene-based monomer include bicyclo[2.2.1]hept-2-ene (trivial name: norbornene), 5-methylbicyclo[2.2.1]hept-2-ene, 5,5-dimethylbicyclo[2.2.1]hept-2-ene, 5-ethylbicyclo[2.2.1]hept-2-ene, 5-ethylidenebicyclo[2.2.1]hept-2-ene, 5-vinylbicyclo[2.2.1]hept-2-ene, 5-propenylbicyclo[2.2.1]hept-2-ene, 5-methoxycarbonylbicyclo[2.2.1]hept-2-ene, 5-cyanobicyclo[2.2.1]hept-2-ene, 5-methyl-5-methoxycarbonylbicyclo[2.2.1]hept-2-ene, and the like.

Examples of the dicyclopentadiene-based monomer include tricyclo[4.3.0.1$^{2,5}$]deca-3,7-diene (trivial name: dicyclopentadiene), 2-methyldicyclopentadiene, 2,3-dimethyldicyclopentadiene, 2,3-dihydroxydicyclopentadiene, and the like.

Examples of the methanotetrahydrofluorene-based monomer include 7,8-benzotricyclo[4.3.0.1$^{2,5}$]dec-3-ene (trivial name: methanotetrahydrofluorene (also referred to as 1,4-methano-1,4,4a,9a-tetrahydrofluorene)), 1,4-methano-8-methyl-1,4,4a,9a-tetrahydrofluorene, 1,4-methano-8-chloro- 1,4,4a,9a-tetrahydrofluorene, 1,4-methano-8-bromo-1,4,4a, 9a-tetrahydrofluorene, and the like.

These norbornene monomers may be used in combination.

The methanotetrahydrofluorene-based monomer is preferable as a monomer other than the tetracyclododecene-based monomer from the viewpoint of reducing the birefringence of the resulting optical lens. The methanotetrahydrofluorene-based monomer is normally used in a ratio of 10 to 90 wt %, preferably 50 to 90 wt %, and more preferably 60 to 80 wt %, based on the total monomers. If the ratio of the methanotetrahydrofluorene-based monomer is too low, the birefringence of the resulting optical lens may increase.

The norbornene-based monomer is also preferable as a monomer other than the tetracyclododecene-based monomer since it is possible to easily adjust the glass transition temperature of the norbornene-based polymer. The norbornene-based monomer is normally used in a ratio of 0 to 20 wt %, preferably 1 to 15 wt %, and more preferably 3 to 10 wt %. If the ratio of the norbornene-based monomer is too high, the heat resistance (glass transition temperature) of the norbornene-based monomer may decrease to a large extent.

The dicyclopentadiene-based monomer may also be used as a monomer other than the tetracyclododecene-based monomer. The dicyclopentadiene-based monomer is normally used in a ratio of 0 to 10 wt %, and preferably 0 to 5 wt %. If the ratio of the dicyclopentadiene-based monomer is too high, the birefringence of the resulting optical lens may increase.

A norbornene-based polymer produced using 15 to 50 wt % of the tetracyclododecene-based monomer, 10 to 90 wt % of the methanotetrahydrofluorene-based monomer, and 1 to 15 wt % of the norbornene-based polymer (the total amount of the tetracyclododecene-based monomer, the methanotetrahydrofluorene-based monomer, and the norbornene-based monomer is 100 wt %) is preferable since such a norbornene-based polymer can produce a hydrogenated norbornene-based ring-opening polymer that can produce (form) a thin formed article (optical element) that exhibits birefringence and heat resistance in a well-balanced manner.

Ring-opening Polymer of Norbornene Monomer

A ring-opening polymer of the norbornene monomer, or a ring-opening polymer of the norbornene monomer and a monomer that can undergo ring-opening copolymerization with the norbornene monomer, may be obtained by polymerizing the monomer component in the presence of a known ring-opening polymerization catalyst. Examples of the ring-opening polymerization catalyst include a catalyst that includes a halide of a metal (e.g., ruthenium or osmium), a nitrate or an acetylacetone compound, and a reducing agent, and a catalyst that includes a halide or an acetylacetone compound of a metal (e.g., titanium, zirconium, tungsten, or molybdenum), and an organoaluminum compound.

Examples of the monomer that can undergo ring-opening copolymerization with the norbornene monomer include a monocyclic cycloolefin-based monomer such as cyclohexene, cycloheptene, and cyclooctene, and the like.

Hydrogenated Ring-opening Polymer of Norbornene Monomer

A hydrogenated ring-opening polymer of the norbornene monomer may normally be obtained by adding a known hydrogenation catalyst that includes a transition metal (e.g., nickel or palladium) to a solution of the ring-opening polymer, and hydrogenating the carbon-carbon unsaturated bonds included in the ring-opening polymer.

Addition Polymer of Norbornene Monomer

An addition polymer of the norbornene monomer, or an addition polymer of the norbornene monomer and a monomer that can undergo addition copolymerization with the norbornene monomer, may be obtained by polymerizing the monomer(s) using a known addition polymerization catalyst (e.g., a catalyst that includes a titanium, zirconium, or vanadium compound and an organoaluminum compound).

Examples of the monomer that can undergo addition copolymerization with the norbornene monomer include an α-olefin having 2 to 20 carbon atoms, such as ethylene, propylene, 1-butene, 1-pentene, and 1-hexene, and derivatives thereof; a cycloolefin such as cyclobutene, cyclopentene, cyclohexene, cyclooctene, and 3a,5,6,7a-tetrahydro-4, 7-methano-1H-indene, and derivatives thereof; a nonconjugated diene such as 1,4-hexadiene, 4-methyl-1,4-hexadiene, 5-methyl-1,4-hexadiene, and 1,7-octadiene; and the like. Among these, an α-olefin is preferable, and ethylene is particularly preferable.

These monomers that can undergo addition copolymerization with the norbornene monomer may be used in combination. When subjecting the norbornene monomer and the monomer that can undergo addition copolymerization with the norbornene monomer to addition copolymerization, the norbornene monomer and the monomer that can undergo addition copolymerization with the norbornene monomer are appropriately selected (or the amounts thereof are appropriately selected) so that the resulting addition polymer normally includes structural units derived from the norbornene monomer and structural units derived from the monomer that can undergo addition copolymerization with the norbornene monomer in a weight ratio of 30:70 to 99:1, preferably 50:50 to 97:3, and more preferably 60:40 to 95:5.

It is preferable to subject the norbornene monomer and the monomer that can undergo addition copolymerization with the norbornene monomer to addition copolymerization, and it is particularly preferable to subject the norbornene monomer and ethylene to addition copolymerization, from the viewpoint of heat resistance, mechanical strength, formability (moldability), and the like.

Norbornene-based Polymer Obtained by Polymerizing Norbornene Monomer in the Presence of α-olefin Having 14 to 40 Carbon Atoms A preferable norbornene-based polymer may be produced by polymerizing the norbornene monomer in the presence of an α-olefin having 14 to 40 carbon atoms.

The α-olefin having 14 to 40 carbon atoms is not particularly limited as long as the α-olefin has 14 to 40 carbon atoms. Specific examples of the α-olefin having 14 to 40 carbon atoms include a monosubstituted olefin in which the alkyl chain is substituted with one or more substituents, such as 3-methyltetradecene, 4-methyltetradecene, 10-methyltetradecene, and 5-cyclohexylhexadecene; a linear α-olefin such as 1-tetradecene, 1-hexadecene, 1-octadecene, 1-eicosacene, 1-docosene, and 1-tetracontene; and the like. It is particularly preferable to use a linear α-olefin having 16 to 30 carbon atoms.

It is preferable that the norbornene-based polymer include structural units derived from the α-olefin having 14 to 40 carbon atoms in an amount of 0.5 to 5.0 parts by weight, more preferably 1.0 to 4.0 parts by weight, and particularly preferably 1.3 to 3.0 parts by weight, based on the total amount (=100 parts by weight) of the norbornene monomer and the monomer that is copolymerizable with the norbornene monomer. If the amount of structural units derived from the α-olefin having 14 to 40 carbon atoms is too large, the glass transition temperature of the norbornene-based polymer may decrease to a large extent. If the amount of structural units derived from the α-olefin having 14 to 40 carbon atoms is too small, the resulting formed article may exhibit high birefringence around the gate.

An example in which the norbornene monomer is polymerized in the presence of a linear α-olefin having 20 carbon atoms (1-eicosene) is shown below.

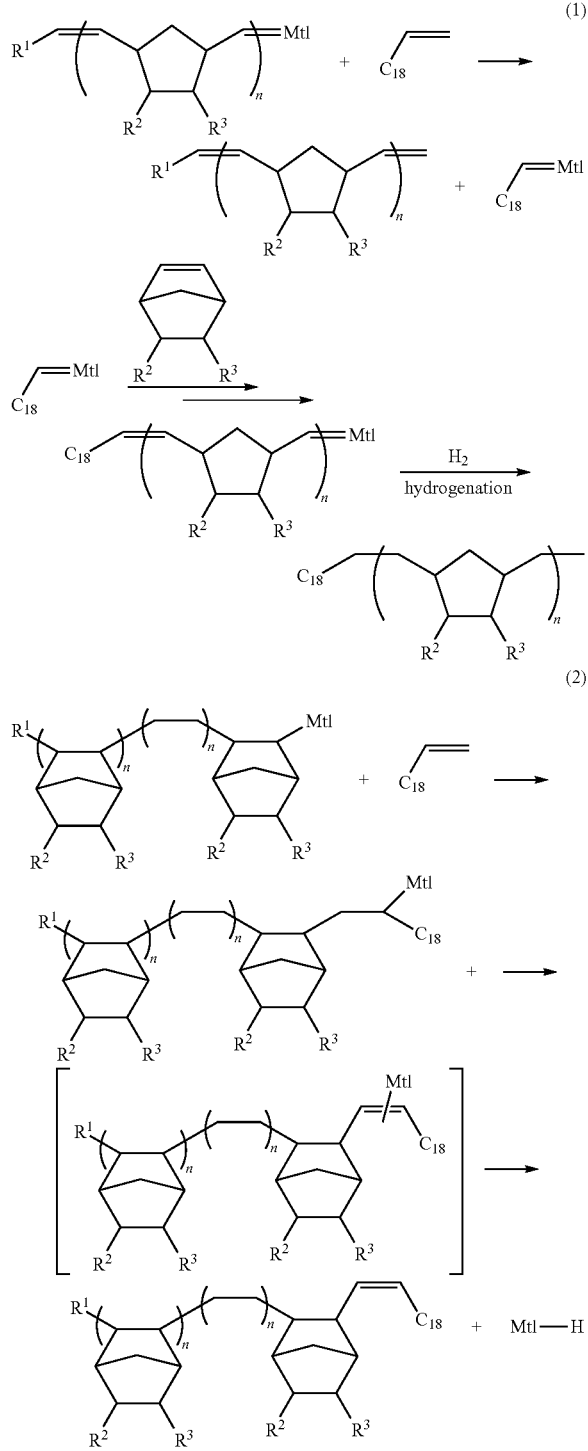

wherein $R^1$ to $R^3$ are an alkyl group, and Mtl is a polymerization catalyst.

The formula (1) shows an example in which a structural unit derived from the α-olefin is introduced into the molecular terminal of a hydrogenated ring-opening polymer of the norbornene monomer. When the active terminal of the polymerization catalyst has reacted with the α-olefin through a chain transfer reaction, the active terminal of the polymerization catalyst is bonded to the terminal of the structure derived from the α-olefin. When the olefin is hydrogenated after the polymerization reaction has proceeded between the active terminal and the monomer, the structural unit derived from the α-olefin is introduced into the molecular terminal.

The formula (2) shows an example in which a structural unit derived from the α-olefin is introduced into the molecular terminal of an addition copolymer of the norbornene monomer and ethylene.

Chain Transfer Agent

The norbornene-based polymer is normally produced by polymerizing the norbornene monomer in the presence of a chain transfer agent (also referred to as "molecular weight modifier") in order to adjust the molecular weight of the norbornene-based polymer. A known compound may be used as the chain transfer agent. Examples of the chain transfer agent include an α-olefin such as 1-butene, 1-pentene, 1-hexene, and 1-octene; a styrene such as styrene and vinyltoluene; an ether such as ethyl vinyl ether, isobutyl vinyl ether, and allyl glycidyl ether; a halogen-containing vinyl compound such as allyl chloride; an oxygen-containing vinyl compound such as glycidyl methacrylate; a nitrogen-containing vinyl compound such as acrylamide; a non-conjugated diene such as 1,4-pentadiene, 1,4-hexadiene, 1,5-hexadiene, 1,6-heptadiene, 2-methyl-1,4-pentadiene, and 2,5-dimethyl-1,5-hexadiene; a conjugated diene such as 1,3-butadiene, 2-methyl-1,3-butadiene, 2,3-dimethyl-1,3-butadiene, 1,3-pentadiene, and 1,3-hexadiene; and the like. Among these, an α-olefin is preferable since it is possible to easily adjust the molecular weight of the norbornene-based polymer.

The α-olefin having 14 to 40 carbon atoms also functions as the chain transfer agent.

When polymerizing the norbornene monomer, two or more linear α-olefins having 14 to 40 carbon atoms may be used in combination, or the linear α-olefin having 14 to 40 carbon atoms may be used in combination with an additional chain transfer agent such as an α-olefin having 4 to 12 carbon atoms or a styrene. When the additional chain transfer agent other than the linear α-olefin having 14 to 40 carbon atoms is also used as the chain transfer agent, the additional chain transfer agent may be added together with the α-olefin having 14 to 40 carbon atoms in a mixed state, or may be added separately from the α-olefin having 14 to 40 carbon atoms.

The chain transfer agent is added in such an amount that a copolymer having the desired molecular weight can be obtained. The chain transfer agent is normally added so that the molar ratio (chain transfer agent:norbornene monomer) of the chain transfer agent to the norbornene monomer is 1:50 to 1:1,000,000, preferably 1:100 to 1:5000, and more preferably 1:300 to 1:3000.

When polymerizing the norbornene monomer in the presence of the α-olefin having 14 to 40 carbon atoms, the amount of the chain transfer agent refers to the sum of the amount of the α-olefin having 14 to 40 carbon atoms and the amount of the additional chain transfer agent.

Polymerization Method

The norbornene monomer may be polymerized using an arbitrary polymerization method. For example, the norbornene monomer may be polymerized using a batch polymerization method (i.e., a method that effects polymerization by adding the polymerization catalyst or the norbornene monomer batchwise to a solvent to which the polymerization catalyst or the norbornene monomer is added in advance), a successive monomer addition method (i.e., a method that effects polymerization while successively (continuously) adding the norbornene monomer to a solvent that includes at least the polymerization catalyst), or the like. It is preferable to use the successive monomer addition method since a more random chain structure can be obtained.

The α-olefin having 14 to 40 carbon atoms may be added to the reaction solvent in advance, or may be successively added together with the norbornene monomer. It is preferable to successively add the α-olefin having 14 to 40 carbon atoms together with the norbornene monomer since an optical element having a large optically effective area can be obtained, and silver streaks rarely occur in the resulting optical element even when the forming (molding) temperature is high.

Polymerization Temperature

The norbornene monomer is normally polymerized at −50 to 250° C., preferably −30 to 200° C., and more preferably −20 to 150° C. The polymerization pressure is normally 0 to 50 kg/cm$^2$, and preferably 0 to 20 kg/cm$^2$. The polymerization time is appropriately selected taking account of the polymerization conditions, but is normally 30 minutes to 20 hours, and preferably 1 to 10 hours.

Number Average Molecular Weight (Mn) of Norbornene-based Polymer

The number average molecular weight (Mn) of the norbornene-based polymer is normally 5000 to 100,000, preferably 6000 to 70,000, and more preferably 7000 to 60,000. The weight average molecular weight (Mw) of the norbornene-based polymer is normally 10,000 to 350,000, preferably 12,000 to 245,000, and more preferably 14,000 to 210,000. The molecular weight of the norbornene-based polymer refers to a standard polyisoprene-equivalent molecular weight determined by gel permeation chromatography (GPC) using cyclohexane as a solvent (eluant). When the number average molecular weight (Mn) and the weight average molecular weight (Mw) of the norbornene-based polymer are within the above ranges, the norbornene-based polymer exhibits mechanical strength and formability in a well-balanced manner. The molecular weight distribution (Mw/Mn) of the norbornene-based polymer is not particularly limited, but is preferably 1 to 5, and more preferably 1 to 4.

Melt Viscosity of Norbornene-based Polymer

The norbornene-based polymer preferably has a value calculated by $(\eta A-\eta B)/\eta B \times 100$ (where, $\eta A$ is the melt viscosity of the optical polymer measured at a temperature of 290° C. and a shear rate of 200 (1/s), and $\eta B$ is the melt viscosity of the optical polymer measured at a temperature of 290° C. and a shear rate of 2000 (1/s)) of less than 60, more preferably less than 50, and particularly preferably less than 40.

If the value calculated by $(\eta A-\eta B)/\eta B \times 100$ is large, the shear rate dependence of the melt viscosity may increase (i.e., the slope of the flow curve may increase), and a weld line may occur on the side opposite to the gate when forming (molding) a thin lens.

The value calculated by $(\eta A-\eta B)/\eta B \times 100$ of the norbornene-based polymer can be adjusted by appropriately adjusting the amount of the tetracyclododecene-based monomer, and the molecular weight of the norbornene-based polymer.

The value calculated by $(\eta A-\eta B)/\eta B \times 100$ (that represents the degree by which the shear rate dependence of the melt viscosity may increase) is within the preferable range when the polyisoprene-equivalent weight average molecular weight of the norbornene-based polymer determined by gel permeation chromatography using a cyclohexane solution (or a toluene solution when the polymer resin is not dissolved in cyclohexane) of the norbornene-based polymer is preferably 20,000 to 30,000, particularly preferably 22,000 to 28,000, and more preferably 23,000 to 26,000.

The tetracyclododecene-based monomer is preferably used in a ratio of 15 to 50 wt %, and more preferably 20 to 40 wt %. If the ratio of the tetracyclododecene-based monomer is too low, the value calculated by $(\eta A-\eta B)/\eta B \times 100$ may increase (i.e., the shear rate dependence of the melt viscosity may increase). If the ratio of the tetracyclododecene-based monomer is too high, the solubility of the norbornene-based polymer in a solvent may decrease, or an increase in birefringence may occur.

Glass Transition Temperature (Tg) of Norbornene-based Polymer

The glass transition temperature (Tg) of the norbornene-based polymer may be appropriately selected taking account of the application. The glass transition temperature (Tg) of the norbornene-based polymer is normally 100 to 160° C., preferably 120 to 150° C., and particularly preferably 130 to 145° C. When the glass transition temperature (Tg) of the norbornene-based polymer is within the above range, a good balance between heat resistance and formability is achieved.

These norbornene-based polymers may be used either alone or in combination.

Additives

The optical polymer may optionally include a known additive as long as the advantageous effects of the invention are not impaired. Examples of the additive include a filler, an antioxidant, a light stabilizer, a release agent, a flame retardant, an antimicrobial agent, a wood powder, a coupling agent, a plasticizer, a colorant, a lubricant, a silicone oil, a blowing agent, a surfactant, a mold release, and the like. A hindered amine-based light stabilizer (HALS) is preferable as the light stabilizer. A fatty acid ester of a polyhydric alcohol is preferable as the release agent.

The additives may be added to the optical polymer using an arbitrary method. For example, the additives may be added to a solution of the optical polymer after filtration, or may be melt-blended with the optical polymer. For example, the optical polymer and the additives may be mixed using a Henschel mixer, a V-blender, a ribbon blender, a tumbler blender, or the like, and melt-mixed using a single-screw extruder, a twin-screw extruder, a kneader, a roll, or the like, or the additives may be added to a solution of the optical polymer after filtration, and a volatile component such as the solvent may be removed.

(3) Optical Element

The optical polymer according to one embodiment of the invention that optionally includes various additives is formed (molded) to obtain an optical element.

The optical polymer is formed (molded) using a known forming (molding) means such as an injection molding method, a compression molding method, an extrusion forming method, a blow molding method, or an inflation molding method. It is preferable to use an injection molding method since an optical part that exhibits excellent transparency can be obtained. The shape of the formed article (optical element) may be appropriately selected taking account of the application. The formed article (optical element) may be in the shape of a plate, a lens, a disc, a film, a sheet, a prism, or the like.

Injection Molding

The resin temperature during injection molding may be determined taking account of the glass transition temperature (Tg) of the optical polymer, but is preferably 200 to 350° C. If the resin temperature is 200° C. or less, a sufficient transfer capability may not be obtained due to low fluidity. If the resin temperature is 350° C. or more, the resin may deteriorate, and burning or contamination of the mold may occur. The density distribution of the formed article (optical element) can be reduced by decreasing the resin temperature within the range that ensures fluidity. On the other hand, lower birefringence can be obtained by increasing the resin temperature within the range that ensures fluidity. The resin temperature is set taking account of the balance between the density distribution and birefringence. The resin temperature is more preferable 230 to 330° C., and particularly preferably 250 to 320° C.

It is preferable that the mold temperature be as high as possible on condition that the mold temperature is lower than the glass transition temperature of the optical polymer. The mold temperature is preferably set to be lower than the glass transition temperature of the optical polymer by 3 to 20° C. If the mold temperature is lower than the above range, a deterioration in transfer capability or an increase in birefringence may occur. If the mold temperature is higher than the above range, the molding cycle time may increase, and productivity may decrease. Productivity is improved by decreasing the mold temperature as long as a deterioration in transfer capability or an increase in birefringence does not occur.

The conditions employed in the measurement step are not particularly limited. The screw rotational speed is normally set to 10 to 100 rpm, and the back pressure is normally set to 3 to 10 MPa. It is preferable to increase the screw rotational speed as long as burning does not occur, and increase the back pressure as long as air bubbles are not formed.

Injection molding may be performed in one step, or may be performed in a plurality of steps. Injection molding is normally performed at an injection speed of 2 to 100 mm/s. If the injection speed is less than 2 mm/s, solidification may occur during injection, and it may be difficult to fill the mold with the resin. If the injection speed is too high, a deterioration in external appearance (e.g., jetting) may occur.

The pressure applied in the dwelling step is preferably 20 MPa or less, more preferably 10 MPa, and particularly preferably 5 MPa. If the pressure applied in the dwelling step is high, optical distortion may occur to a large extent. If the pressure applied in the dwelling step is low, forming failure (e.g., spool clogging) may occur. It is preferable to apply a low pressure as long as forming failure (e.g., spool clogging) does not occur.

It is preferable to reduce the dwelling time as long as gate seal or spool clogging does not occur.

When the cooling time employed in the cooling step is increased, excellent optical properties are obtained due to annealing effects in the mold. In this case, however, the cycle time increases. Therefore, it is desirable to determine the cooling time taking account of the balance between productivity and optical properties.

Applications

The optical element according to one embodiment of the invention exhibits excellent accuracy with respect to the optically effective area as well as low birefringence, and may suitably be used as an optical lens such as a Fresnel lens, a lenticular lens, an fθ lens, and a mobile phone camera lens; and an optical element such as a diffraction grating, a prism, and a blue laser optical disc. The optical element according to one embodiment of the invention is preferably used as an optical lens, and more preferably a thin optical lens that has a small diameter and a non-uniform thickness. Therefore, the optical element according to one embodiment of the invention is optimum as a mobile phone camera lens.

The outer diameter L1 of the optical lens (i.e., preferable optical element) is preferably 10 mm or less, more preferably 7 mm or less, and particularly preferably 5 mm or less.

Figure 2:
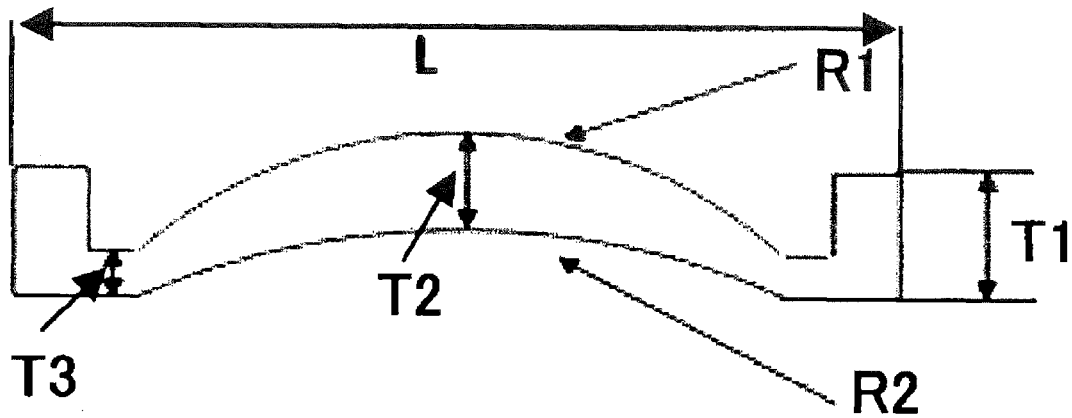
FIG. 2 illustrates a lens in which R1<R2.

The shape of the lens part (optically effective area) of the optical lens (i.e., preferable optical element) preferably satisfies R1>R2 (R1/R2>1), more preferably R1/R2≥1.4, particularly preferably R1/R2≥1.6, and still more preferably R1/R2≥1.8, R1 being the radius of curvature when the convex surface is approximated to a circle, and R2 being the radius of curvature when the concave surface is approximated to a circle. FIG. 1 illustrates the lens shape when R1>R2, and FIG. 2 illustrates the lens shape when R1<R2.

When the optical lens (i.e., preferable optical element) has a uniform thickness, the thickness of the optical lens is preferably 1.00 mm or less, more preferably 0.5 mm or less, and particularly preferably 0.30 mm or less. When the optical lens has a non-uniform thickness, the thickness (T3) of the thinnest part of the lens part is preferably 0.50 mm or less, more preferably 0.30 mm or less, and particularly preferably 0.20 mm or less, the thickness (T1) of the edge part is preferably set so that T1/T3≥1.5, more preferably T1/T3≥2.0, and particularly preferably T1/T3≥2.5, and the thickness (T2) of the thickest part of the lens part is preferably set so that T1/T2≥1.5, more preferably T1/T2≥2.0, and particularly preferably T1/T2≥2.5.

EXAMPLES

The invention is further described below by way of examples and comparative examples. Note that the invention is not limited to the following examples. In the examples and the comparative examples, the unit "parts" refers to "parts by weight", and the unit "%" refers to "wt %" unless otherwise indicated.

The property measurement methods employed in the examples and the comparative examples are described below.

(1) Molecular Weight

The number average molecular weight (Mn), the weight average molecular weight (Mw), and the molecular weight distribution (MWD) (standard polyisoprene-equivalent values) were determined by gel permeation chromatography (GPC) using cyclohexane as a solvent.

GPC was performed using an HLC-8120 GPC system (manufactured by Tosoh Corporation).

Standard polyisoprene manufactured by Tosoh Corporation (Mw=602, 1390, 3920, 8050, 13,800, 22,700, 58,800, 71,300, 109,000, or 280,000) was used as the standard polyisoprene.

The molecular weight was measured in a state in which columns "TSKgel G5000HXL", "TSKgel G4000HXL", and "TSKgelG2000HXL" (manufactured by Tosoh Corporation) were connected in series (flow rate: 1.0 ml/min, sample injection amount: 100 µml, column temperature: 40° C.).

(2) Hydrogenation Ratio (Carbon-carbon Double Bond Residual Ratio)

The hydrogenation ratio of the main chain and the cyclic hydrocarbon structure after hydrogenation was determined by NMR analysis.

(3) Glass Transition Temperature (Tg)

The glass transition temperature was measured in accordance with JIS K 6911 (temperature increase rate: 10° C./min) using a differential scanning calorimeter ("DSC 6220" manufactured by SII NanoTechnology Inc.).

(4) Melt Viscosity

The melt viscosity was measured using a twin capillary rheometer ("Rheologic 5000" manufactured by CEAST).

(5) Evaluation of Thin Lens Formability

Figure 3:
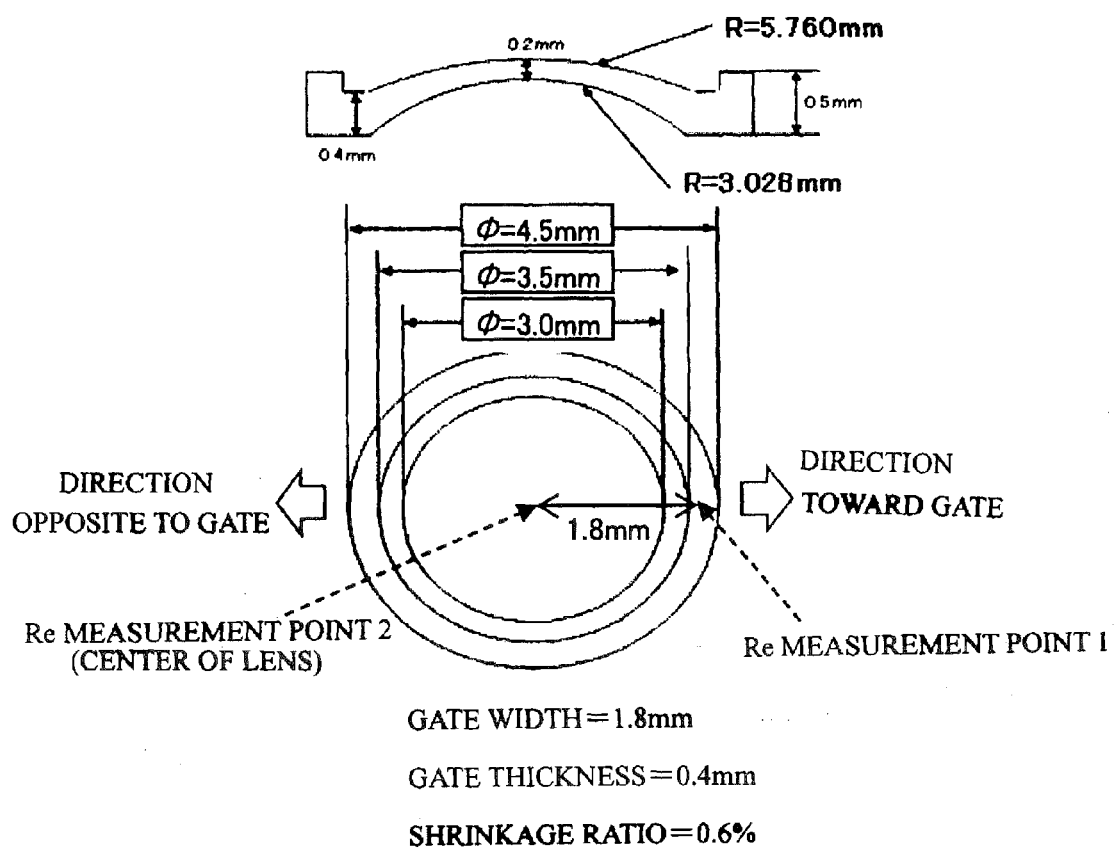
FIG. 3 is a view illustrating a mold that is used to form a lens.

Ten formed articles were produced using an injection molding machine ("FANUC ROBOSHOT (registered trademark) α100B" manufactured by FANUC) (resin temperature: 300° C., mold temperature: Tg-5° C., dwelling: 400 Pa) utilizing a mold (see FIG. 3) designed to form a lens having a convex surface having a radius of curvature of 5.73 mm, a concave surface having a radius of curvature of 3.01 mm, a diameter of 4.5 mm (diameter of lens part: 3 mm), and a center thickness of 0.20 mm.

Evaluation of Birefringence (1) Evaluation of Birefringence (Table 1)

The birefringence of the resulting formed article was measured using a birefringence meter ("KOBRA (registered trademark)-CCD/X" manufactured by Oji Scientific Instruments), and evaluated based on the retardation (wavelength: 650 nm) at the center of the lens. A small retardation represents low birefringence. A case where the retardation was less than 20 was evaluated as "A", a case where the retardation was 20 or more and less than 40 was evaluated as "B", a case where the retardation was 40 or more and less than 60 was evaluated as "C", and a case where the retardation was 60 or more was evaluated as "D".

(2) Evaluation of Birefringence (Tables 2 and 3)

The birefringence of the resulting formed article was measured using a birefringence meter ("KOBRA (registered trademark)-CCD/X" manufactured by Oji Scientific Instruments), and evaluated based on the average retardation (wavelength: 650 nm).

The retardation measured at an Re measurement point [A] situated at a distance of 1.8 mm from the center of the lens in the direction toward the gate is referred to as Re[A], and the retardation measured at an Re measurement point [B] situated at the center of the lens is referred to as Re[B].

A case where the retardation Re[A] was less than 50 nm was evaluated as "A", a case where the retardation Re[A] was 50 nm or more and less than 100 nm was evaluated as "B", and a case where the retardation Re[A] was 100 nm or more was evaluated as "D".

A case where the retardation Re[B] was less than 30 nm was evaluated as "A", a case where the retardation Re[B] was 30 nm or more and less than 60 nm was evaluated as "B", and a case where the retardation Re[B] was 60 nm or more was evaluated as A small retardation represents low birefringence.

Weld Line

The resulting formed article was observed using a microscope, and the length of the weld line was measured (in the direction opposite to the gate). A case where the length of the weld line was less than 0.1 mm was evaluated as "A", a case where the length of the weld line was 0.1 mm or more and less than 0.3 mm was evaluated as "B", a case where the length of the weld line was 0.3 mm or more and less than 0.5 mm was evaluated as "C", and a case where the length of the weld line was 0.5 mm or more was evaluated as "D".

Silver Streaks

The presence or absence of silver streaks was evaluated in accordance with the following standard. The ten formed articles obtained by injection molding were observed with the naked eye. A case where no silver streaks were observed in each formed article (sample) was evaluated as "A", a case where silver streaks were observed in one or two formed articles (samples) was evaluated as "B", a case where silver streaks were observed in three or four formed articles (samples) was evaluated as "C", and a case where silver streaks were observed in five or more formed articles (samples) was evaluated as "D".

Example 1

A polymerization reactor which had been dried and in which the internal atmosphere had been replaced by nitrogen, was charged with 7 parts (1% based on the total amount of the monomers used for polymerization) of a monomer mixture including 70 wt % of methanotetrahydrofluorene (hereinafter abbreviated as "MTF"), 22 wt % of tetracyclododecene (hereinafter abbreviated as "TCD"), and 8 wt % of norbornene (hereinafter abbreviated as "NB"), 1600 parts of dehydrated cyclohexane, 0.6 parts of 1-hexene, 1.3 parts of diisopropyl ether, 0.33 parts of isobutyl alcohol, 0.84 parts of triisobutylaluminum, and 30 parts of a 0.66% cyclohexane solution of tungsten hexachloride. The mixture was stirred at 55° C. for 10 minutes.

693 parts of the monomer mixture and 72 parts of a 0.77% cyclohexane solution of tungsten hexachloride were continuously added dropwise to the polymerization reactor over 150 minutes with stirring while maintaining the reaction system at 55° C. After completion of the dropwise addition, the mixture was stirred for 30 minutes, followed by addition of 1.0 part of isopropyl alcohol to terminate the polymerization reaction. The conversion ratio of the monomers into a polymer determined by subjecting the polymer solution to gas chromatography was 100%.

300 parts of the polymer solution including the polymer was transferred to an autoclave equipped with a stirrer, and 100 parts of cyclohexane and 2.0 parts of a diatomaceous earth-supported nickel catalyst ("T8400RL" manufactured by Nikki Chemical Co., Ltd., nickel content: 58%) were added to the polymer solution. After replacing the internal atmosphere in the autoclave by hydrogen, the mixture was reacted at 180° C. for 6 hours under a hydrogen pressure of 4.5 MPa.

After completion of the hydrogenation reaction, the mixture was filtered through a pressure filter ("FUNDABAC filter" manufactured by IHI Corporation) (filtration bed: diatomaceous earth ("Radiolite (registered trademark) #500" manufactured by Showa Chemical Industry Co., Ltd.)) under a pressure of 0.25 MPa to obtain a colorless and transparent solution.

0.5 parts (based on 100 parts of the hydrogenated product) of pentaerythrityltetrakis[3-(3,5-di-t-butyl-4-hydroxyphenyl) propionate] ("Irganox (registered trademark) 1010" manufactured by BASF Japan Ltd.) (antioxidant) was added to (dissolved in) the solution.

The resulting solution was filtered through a filter ("Zeta Plus (registered trademark) 30H" manufactured by Cuno K.K., pore size: 0.5 to 1 µm), and the filtrate was filtered through a metal fiber filter (manufactured by Nichidai Corporation, pore size: 0.4 µm) to remove a foreign substance.

The solvent (cyclohexane) and other volatile components were removed from the solution at a temperature of 260° C. under a pressure of 1 kPa or less using a cylindrical evaporator (manufactured by Hitachi Ltd.). The residue was extruded in the shape of a strand in a molten state from a die connected to the evaporator, cooled with water, and cut using a pelletizer ("OSP-2" manufactured by Osada Seisakusho) to obtain pellets of a norbornene-based polymer.

The norbornene-based polymer had a weight average molecular weight (Mw) of 24,000, a molecular weight distribution (Mw/Mn) of 1.75, a hydrogenation ratio of 99.9%, and a glass transition temperature (Tg) of 140° C.

A thin lens was formed using the resulting pellets. The evaluation results are shown in Table 1.

Example 2

A norbornene-based polymer was obtained in the same manner as in Example 1, except that a monomer mixture including 65 wt % of MTF, 30 wt % of TCD, and 5 wt % of NB was used as the monomer mixture, and the amount of 1-hexene was changed to 0.55 parts.

The conversion ratio of the monomers into a polymer was 99.9%. The resulting norbornene-based polymer had a weight average molecular weight (Mw) of 25,000, a molecular weight distribution (Mw/Mn) of 1.72, a hydrogenation ratio of 99.9%, and a glass transition temperature (Tg) of 145° C.

A thin lens was formed using the resulting pellets. The evaluation results are shown in Table 1.

Example 3

A norbornene-based polymer was obtained in the same manner as in Example 2, except that the amount of 1-hexene was changed to 0.45 parts.

The conversion ratio of the monomers into a polymer was 99.9%. The resulting norbornene-based polymer had a weight average molecular weight (Mw) of 29,000, a molecular weight distribution (Mw/Mn) of 1.88, a hydrogenation ratio of 99.9%, and a glass transition temperature (Tg) of 145° C.

A thin lens was formed using the resulting pellets. The evaluation results are shown in Table 1.

Example 4

A norbornene-based polymer was obtained in the same manner as in Example 3, except that a monomer mixture including 20 wt % of ethylidene norbornene (hereinafter abbreviated as "ETD"), 80 wt % of dicyclopentadiene (hereinafter abbreviated as "DCP"), and 8 wt % of NB was used as the monomer mixture.

The conversion ratio of the monomers into a polymer was 99.9%. The resulting norbornene-based polymer had a weight average molecular weight (Mw) of 28,500, a molecular weight distribution (Mw/Mn) of 2.12, a hydrogenation ratio of 99.9%, and a glass transition temperature (Tg) of 105° C.

A thin lens was formed using the resulting pellets. The evaluation results are shown in Table 1.

Example 5

A norbornene-based polymer was obtained in the same manner as in Example 3, except that a monomer mixture including 40 wt % of MTF, 35 wt % of TCD, and 25 wt % of DCP was used as the monomer mixture, and the amount of 1-hexene was changed to 0.55 parts.

The conversion ratio of the monomers into a polymer was 99.9%. The resulting norbornene-based polymer had a weight average molecular weight (Mw) of 29,500, a molecular weight distribution (Mw/Mn) of 2.22, a hydrogenation ratio of 99.9%, and a glass transition temperature (Tg) of 141° C.

A thin lens was formed using the resulting pellets. The evaluation results are shown in Table 1.

Example 6

A norbornene-based polymer was obtained in the same manner as in Example 1, except that a monomer mixture including 49 wt % of MTF, 46 wt % of TCD, and 6 wt % of NB was used as the monomer mixture.

The conversion ratio of the monomers into a polymer was 99.9%. The resulting norbornene-based polymer had a weight average molecular weight (Mw) of 25,500, a molecular weight distribution (Mw/Mn) of 1.71, a hydrogenation ratio of 99.9%, and a glass transition temperature (Tg) of 145° C.

A thin lens was formed using the resulting pellets. The evaluation results are shown in Table 1.

Example 7

A norbornene-based polymer was obtained in the same manner as in Example 1, except that a monomer mixture including 45 wt % of MTF, 25 wt % of TCD, and 20 wt % of NB was used as the monomer mixture.

The conversion ratio of the monomers into a polymer was 99.9%. The resulting norbornene-based polymer had a weight average molecular weight (Mw) of 26,500, a molecular weight distribution (Mw/Mn) of 1.64, a hydrogenation ratio of 99.9%, and a glass transition temperature (Tg) of 98° C.

A thin lens was formed using the resulting pellets. The evaluation results are shown in Table 1.

Comparative Example 1

A norbornene-based polymer was obtained in the same manner as in Example 1, except that a monomer mixture including 80 wt % of MTF, 10 wt % of TCD, and 10 wt % of NB was used as the monomer mixture.

The conversion ratio of the monomers into a polymer was 99.9%. The resulting norbornene-based polymer had a weight average molecular weight (Mw) of 25,500, a molecular weight distribution (Mw/Mn) of 1.72, a hydrogenation ratio of 99.9%, and a glass transition temperature (Tg) of 134° C.

A thin lens was formed using the resulting pellets. The evaluation results are shown in Table 1.

Comparative Example 2

A polymerization reaction and a hydrogenation reaction were effected in the same manner as in Example 1, except that a monomer mixture including 39 wt % of MTF, 55 wt % of TCD, and 5 wt % of NB was used as the monomer mixture. After completion of the hydrogenation reaction, the mixture was filtered through a pressure filter ("FUNDABAC filter" manufactured by MI Corporation) (filtration bed:

diatomaceous earth ("Radiolite #500")) under a pressure of 0.25 MPa. However, a filtrate could not be obtained due to clogging.

Comparative Example 3

A norbornene-based polymer was obtained in the same manner as in Example 2, except that the amount of 1-hexene was changed to 0.40 parts.

The conversion ratio of the monomers into a polymer was 99.9%. The resulting norbornene-based polymer had a weight average molecular weight (Mw) of 31,000, a molecular weight distribution (Mw/Mn) of 1.95, a hydrogenation ratio of 99.9%, and a glass transition temperature (Tg) of 145° C.

A thin lens was formed using the resulting pellets. The evaluation results are shown in Table 1.

Comparative Example 4

A norbornene-based polymer was obtained in the same manner as in Example 1, except that a monomer mixture including 45 wt % of MTF, 10 wt % of TCD, and 45 wt % of dicyclopentadiene was used as the monomer mixture.

The conversion ratio of the monomers into a polymer was 99.9%. The resulting norbornene-based polymer had a weight average molecular weight (Mw) of 25,500, a molecular weight distribution (Mw/Mn) of 1.92, a hydrogenation ratio of 99.9%, and a glass transition temperature (Tg) of 130° C.

A thin lens was formed using the resulting pellets. The evaluation results are shown in Table 1.

TABLE 1

| | Norbornene monomer composition | | | | | Chain transfer agent | | | |
| | | | | | | α-olefin having 14 to 40 carbon atoms | | Another α-olefin | |
| | MTF wt % | TCD wt % | ETD wt % | DCP wt % | NB wt % | Type | Parts by weight | Type | Parts by weight |
| --- | --- | --- | --- | --- | --- | --- | --- | --- | --- |
| Example 1 | 70 | 22 | — | — | 8 | — | — | 1-Hexene (C6) | 0.6 |
| Example 2 | 65 | 30 | — | — | 5 | — | — | 1-Hexene (C6) | 0.55 |
| Example 3 | 65 | 30 | — | — | 5 | — | — | 1-Hexene (C6) | 0.45 |
| Example 4 | — | — | 20 | 80 | — | — | — | 1-Hexene (C6) | 0.45 |
| Example 5 | 40 | 35 | — | 25 | — | — | — | 1-Hexene (C6) | 0.55 |
| Example 6 | 49 | 45 | — | — | 6 | — | — | 1-Hexene (C6) | 0.6 |
| Example 7 | 45 | 25 | — | — | 20 | — | — | 1-Hexene (C6) | 0.6 |
| Comparative Example 1 | 80 | 10 | — | — | 10 | — | — | 1-Hexene (C6) | 0.6 |
| Comparative Example 2 | 39 | 55 | — | — | 6 | — | — | 1-Hexene (C6) | 0.6 |
| Comparative Example 3 | 65 | 30 | — | — | 5 | — | — | 1-Hexene (C6) | 0.40 |
| Comparative Example 4 | 45 | 10 | — | 45 | — | — | — | 1-Hexene (C6) | 0.6 |

| | Property evaluation results | | | | | | |
| | Mw | Tg | ηA | ηB | | Evaluation of formability | |
| | ×10$^4$ | ° C. | 1/s | 1/s | (ηA − ηB)/ηB × 100 | Evaluation of birefringence | Weld line |
| --- | --- | --- | --- | --- | --- | --- | --- |
| Example 1 | 2.40 | 140 | 80 | 58 | 38 | A | A |
| Example 2 | 2.50 | 145 | 75 | 55 | 36 | A | A |
| Example 3 | 2.90 | 145 | 110 | 70 | 57 | B | C |
| Example 4 | 2.85 | 105 | 53 | 42 | 26 | C | A |
| Example 5 | 2.95 | 141 | 125 | 87 | 44 | C | B |
| Example 6 | 2.55 | 145 | 81 | 62 | 31 | B | A |
| Example 7 | 2.65 | 98 | 55 | 45 | 22 | B | A |
| Comparative Example 1 | 2.50 | 134 | 58 | 35 | 66 | A | D |
| Comparative Example 2 | | | | Filtrate could not be obtained due to clogging | | | |
| Comparative Example 3 | 3.10 | 145 | 125 | 75 | 67 | B | D |
| Comparative Example 4 | 2.66 | 130 | 80 | 45 | 78 | D | D |

Discussion

The following were confirmed from the results shown in Table 1.

The weld line evaluation results were poor when the value calculated by (ηA−ηB)/ηB×100 was large (Comparative Examples 1, 3, and 4). Note that a filtrate could not be obtained in Comparative Example 2.

Better weld line evaluation results were obtained as the value calculated by (ηA−ηB)/ηB×100 was smaller (Examples 1 to 7).

The value calculated by (ηA−ηB)/ηB×100 decreased, and better weld line evaluation results and birefringence evaluation results were obtained as the weight average molecular weight (Mw) was lower (as is clear from the comparison between Examples 2 and 3 and Comparative Example 3).

The value calculated by (ηA−ηB)/ηB×100 decreased, and better weld line evaluation results and birefringence evaluation results were obtained as the ratio of the tetracyclododecene-based monomer (TCD) was higher (as is clear from the comparison between Example 2 and Comparative Example 1, and the comparison between Example 7 and Comparative Example 4).

Better birefringence evaluation results were obtained as the ratio of the methanotetrahydrofluorene-based monomer (MTF) was higher (Examples 1 to 7).

Examples 8 to 17 and Comparative Example 5

A polymerization reactor which had been dried and in which the internal atmosphere had been replaced by nitrogen, was charged with 7 parts (1% based on the total amount of the monomers used for polymerization) of the norbornene monomer mixture shown in Table 2, 1600 parts of dehydrated cyclohexane, the chain transfer agent shown in Table 2 in the amount shown in Table 2, 1.3 parts of diisopropyl ether, 0.33 parts of isobutyl alcohol, 0.84 parts of triisobutylaluminum, and 30 parts of a 0.66% cyclohexane solution of tungsten hexachloride. The mixture was stirred at 55° C. for 10 minutes.

693 parts of the monomer mixture and 72 parts of a 0.77% cyclohexane solution of tungsten hexachloride were continuously added dropwise to the polymerization reactor over 150 minutes with stirring while maintaining the reaction system at 55° C. After completion of the dropwise addition, the mixture was stirred for 30 minutes, followed by addition of 1.0 part of isopropyl alcohol to terminate the polymerization reaction. The conversion ratio of the monomers into a polymer determined by subjecting the polymer solution to gas chromatography was 100%.

300 parts of the polymer solution including the polymer was transferred to an autoclave equipped with a stirrer, and 100 parts of cyclohexane and 2.0 parts of a diatomaceous earth-supported nickel catalyst ("T8400RL" manufactured by Nikki Chemical Co., Ltd., nickel content: 58%) were added to the polymer solution. After replacing the internal atmosphere in the autoclave by hydrogen, the mixture was reacted at 180° C. for 6 hours under a hydrogen pressure of 4.5 MPa.

After completion of the hydrogenation reaction, the mixture was filtered through a pressure filter ("FUNDABAC filter" manufactured by IHI Corporation) (filtration bed: diatomaceous earth ("Radiolite (registered trademark) #500" manufactured by Showa Chemical Industry Co., Ltd.)) under a pressure of 0.25 MPa to obtain a colorless and transparent solution.

0.5 parts (based on 100 parts of the hydrogenated product) of pentaerythrityltetrakis[3-(3,5-di-t-butyl-4-hydroxyphenyl) propionate] ("Irganox (registered trademark) 1010" manufactured by BASF Japan Ltd.) (antioxidant) was added to (dissolved in) the solution.

The resulting solution was filtered through a filter ("Zeta Plus (registered trademark) 30H" manufactured by Cuno K.K., pore size: 0.5 to 1 μm), and the filtrate was filtered through a metal fiber filter (manufactured by Nichidai Corporation, pore size: 0.4 μm) to remove a foreign substance.

The solvent (cyclohexane) and other volatile components were removed from the solution at a temperature of 260° C. under a pressure of 1 kPa or less using a cylindrical evaporator (manufactured by Hitachi Ltd.). The residue was extruded in the shape of a strand in a molten state from a die connected to the evaporator, cooled with water, and cut using a pelletizer ("OSP-2" manufactured by Osada Seisakusho) to obtain pellets of a norbornene-based polymer.

Table 2 shows the molecular weight (Mw), the glass transition temperature (Tg), and the melt viscosity of each norbornene-based polymer. The hydrogenation ratio of each norbornene-based polymer was 99% or more.

TABLE 2

| | Norbornene monomer composition | | | | Chain transfer agent | | | |
| | | | | | α-olefin having 14 to 40 carbon atoms | | Another α-olefin | |
| | MTF wt % | TCD wt % | DCP wt % | NB wt % | Type | Parts by weight* | Type | Parts by weight* |
|---|---|---|---|---|---|---|---|---|
| Example 8 | 100 | — | — | — | 1-Docosene (C22) | 2.0 | — | — |
| Example 9 | 100 | — | — | — | 1-Docosene (C22) | 1.5 | 1-Hexene (C6) | 0.1 |
| Example 10 | 100 | — | — | — | 1-Docosene (C22) | 1.0 | 1-Decene (C10) | 0.5 |
| Example 11 | 65 | 30 | — | 5 | 1-Docosene (C22) | 2.0 | — | — |
| Comparative Example 5 | 65 | 30 | — | 5 | 1-Docosene (C22) | 1.5 | — | — |
| Example 12 | 65 | 30 | — | 5 | 1-Hexadecene (C16) | 1.5 | — | — |
| Example 13 | 40 | 35 | 25 | — | 1-Docosene (C22) | 2.0 | — | — |
| Example 14 | 100 | — | — | — | — | — | 1-Hexene (C6) | 0.6 |

TABLE 2-continued

| | | | | | | | | |
|---|---|---|---|---|---|---|---|---|
| Example 15 | 65 | 30 | — | 5 | — | — | 1-Hexene (C6) | 0.6 |
| Example 16 | 65 | 30 | — | 5 | — | — | 1-Decene (C10) | 0.6 |
| Example 17 | 40 | 35 | 25 | — | — | — | 1-Hexene (C6) | 0.6 |

| | Property evaluation results | | | | Evaluation of formability | | | |
|---|---|---|---|---|---|---|---|---|
| | Mw | Tg | ηA | ηB | | Evaluation of birefringence | | |
| | ×10$^4$ | °C. | 1/s | 1/s | (ηA − ηB)/ηB × 100 | Re[A] | Re[B] | Weld line |
| Example 8 | 2.4 | 153 | 80 | 51 | 57 | A | A | B |
| Example 9 | 2.5 | 155 | 85 | 55 | 55 | A | A | B |
| Example 10 | 2.4 | 156 | 83 | 53 | 57 | B | A | B |
| Example 11 | 2.4 | 142 | 70 | 52 | 35 | A | A | A |
| Comparative Example 5 | 2.9 | 144 | 105 | 63 | 67 | B | B | D |
| Example 12 | 2.5 | 144 | 73 | 53 | 38 | B | A | A |
| Example 13 | 2.5 | 138 | 71 | 52 | 37 | B | B | A |
| Example 14 | 2.5 | 160 | 87 | 56 | 55 | D | A | B |
| Example 15 | 2.5 | 149 | 75 | 54 | 39 | D | A | A |
| Example 16 | 2.4 | 149 | 73 | 53 | 38 | D | A | A |
| Example 17 | 2.5 | 145 | 74 | 52 | 42 | D | D | A |

*Amount based on the total amount (=100 parts by weight) of the norbornene monomer and the additional monomer copolymerizable with the norbornene monomer Discussion The following were confirmed from the results shown in Table 2.

The retardation Re[A] was large when the norbornene-based polymer did not include a structural unit derived from an α-olefin having 14 to 40 carbon atoms at a molecular terminal thereof (Examples 14 to 17).

The retardation Re[A] was small when the norbornene-based polymer included a structural unit derived from an α-olefin having 14 to 40 carbon atoms at a molecular terminal thereof (Examples 8 to 13).

Good weld line evaluation results were obtained when the value calculated by (ηA−ηB)/ηB×100 was less than 60 (Examples 8 to 17).

Examples 18 and 19

A monomer-chain transfer agent mixture was prepared by mixing norbornene monomers and a chain transfer agent in the ratio shown in Table 3.

A polymerization reactor which had been dried and in which the internal atmosphere had been replaced by nitrogen, was charged with 7 parts (1% based on the total amount of the monomers used for polymerization) of the monomer-chain transfer agent mixture, 1600 parts of dehydrated cyclohexane, 1.3 parts of diisopropyl ether, 0.33 parts of isobutyl alcohol, 0.84 parts of triisobutylaluminum, and 30 parts of a 0.66% cyclohexane solution of tungsten hexachloride. The mixture was stirred at 55° C. for 10 minutes.

693 parts of the monomer-chain transfer agent mixture and 72 parts of a 0.77% cyclohexane solution of tungsten hexachloride were continuously added dropwise to the polymerization reactor over 150 minutes with stirring while maintaining the reaction system at 55° C. After completion of the dropwise addition, the mixture was stirred for 30 minutes, followed by addition of 1.0 part of isopropyl alcohol to terminate the polymerization reaction. The conversion ratio of the monomers into a polymer determined by subjecting the polymer solution to gas chromatography was 100%.

300 parts of the polymer solution was transferred to an autoclave equipped with a stirrer, and 100 parts of cyclohexane and 2.0 parts of a diatomaceous earth-supported nickel catalyst ("T8400RL" manufactured by Nikki Chemical Co., Ltd., nickel content: 58%) were added to the polymer solution. After replacing the internal atmosphere in the autoclave by hydrogen, the mixture was reacted at 180° C. for 6 hours under a hydrogen pressure of 4.5 MPa.

After completion of the hydrogenation reaction, the mixture was filtered through a pressure filter ("FUNDABAC filter" manufactured by IHI Corporation) (filtration bed: diatomaceous earth ("Radiolite (registered trademark) #500" manufactured by Showa Chemical Industry Co., Ltd.)) under a pressure of 0.25 MPa to obtain a colorless and transparent solution.

0.5 parts (based on 100 parts of the hydrogenated product) of pentaerythrityltetrakis[3-(3,5-di-t-butyl-4-hydroxyphenyl) propionate] ("Irganox (registered trademark) 1010" manufactured by BASF Japan Ltd.) (antioxidant) was added to (dissolved in) the solution.

The resulting solution was filtered through a filter ("Zeta Plus (registered trademark) 30H" manufactured by Cuno K.K., pore size: 0.5 to 1 μm), and the filtrate was filtered through a metal fiber filter (manufactured by Nichidai Corporation, pore size: 0.4 μm) to remove a foreign substance.

The solvent (cyclohexane) and other volatile components were removed from the solution at a temperature of 260° C. under a pressure of 1 kPa or less using a cylindrical evaporator (manufactured by Hitachi Ltd.). The residue was extruded in the shape of a strand in a molten state from a die connected to the evaporator, cooled with water, and cut using a pelletizer ("OSP-2" manufactured by Osada Seisakusho) to obtain pellets of a norbornene-based polymer.

Table 2 shows the molecular weight (Mw), the glass transition temperature (Tg), and the melt viscosity of each norbornene-based polymer. The hydrogenation ratio of each norbornene-based polymer was 99% or more.

The evaluation results are shown in Table 3.

TABLE 3

| | Norbornene monomer composition | | | | Chain transfer agent | | | |
| --- | --- | --- | --- | --- | --- | --- | --- | --- |
| | | | | | α-olefin having 14 to 40 carbon atoms | | Another α-olefin | |
| | MTF | TCD | DCP | NB | | | | |
| | wt % | wt % | wt % | wt % | Type | Parts by weight* | Type | Parts by weight* |
| Example 18 | 65 | 30 | — | 5 | 1-Octadecene (C18) | 1.5 | — | — |
| Example 19 | 65 | 30 | — | 5 | 1-Octadecene (C18) | 2.0 | — | — |

| | Property evaluation results | | | | Evaluation of formability | | | |
| --- | --- | --- | --- | --- | --- | --- | --- | --- |
| | Mw | Tg | ηA | ηB | Evaluation of birefringence | | | |
| | ×10⁴ | °C. | 1/s | 1/s | (ηA − ηB)/ηB × 100 | Re[A] | Re[B] | Weld line | Silver streaks |
| Example 18 | 2.5 | 138 | 66 | 48 | 38 | B | A | A | A |
| Example 19 | 2.4 | 137 | 63 | 46 | 37 | A | A | A | A |

*Amount based on the total amount (=100 parts by weight) of the norbornene monomer and the additional monomer copolymerizable with the norbornene monomer Discussion The results shown in Table 3 suggest that silver streaks do not occur in the resulting formed article when the polymerizable monomers and the chain transfer agent are added successively (added dropwise continuously) (Example 18 and 19).

INDUSTRIAL APPLICABILITY

An optical element obtained by forming the optical polymer according to the embodiments of the invention has a large optically effective area (i.e., rarely produces optical defects), and may preferably be used as an optical lens, and more preferably a thin optical lens that has a small diameter and a non-uniform thickness. Therefore, the optical element may be optimum as a mobile phone camera lens.

REFERENCE SIGNS LIST

R1: Radius of curvature when convex surface is approximated to circle
R2: Radius of curvature when concave surface is approximated to circle
T1: Thickness of edge
T2: Thickness of thickest part of lens part
T3: Thickness of thinnest part of lens part

The invention claimed is:

1. An optical lens formed from an optical polymer satisfying an expression (1), $(\eta A-\eta B)/\eta B \times 100 < 60$ (1) where, $\eta A$ is the melt viscosity of the optical polymer measured at a temperature of 290° C. and a shear rate of 200 (l/s), and $\eta B$ is the melt viscosity of the optical polymer measured at a temperature of 290° C. and a shear rate of 2000 (l/s), the lens having a thickness of 0.50 mm or less at its thinnest part.

2. The optical lens according to claim 1, wherein the optical polymer is a norbornene-based polymer.

3. The optical lens according to claim 2, wherein the norbornene-based polymer has a glass transition temperature of 100 to 160° C.

4. The optical lens according to claim 2, wherein the norbornene-based polymer comprises a structural unit derived from an α-olefin having 14 to 40 carbon atoms at a molecular terminal thereof.

5. The optical lens according to claim 4, wherein the norbornene-based polymer is a norbornene-based polymer obtained by polymerizing a norbornene monomer in the presence of an α-olefin having 14 to 40 carbon atoms.

6. The optical lens according to claim 4, wherein the norbornene-based polymer is obtained by successively adding a polymerizable monomer that comprises a norbornene monomer, and an α-olefin having 14 to 40 carbon atoms to a solvent that comprises at least a polymerization catalyst.

7. The optical lens according to claim 1, satisfying the formula T1/T3≥1.5 wherein T1 is the thickness of an edge part and T3 is the thickness of the thinnest part of the lens.

8. The optical lens according to claim 1, satisfying the formula T1/T2≥1.5 wherein T1 is the thickness of an edge part and T2 is the thickness of the thickest part of the lens.

9. A method of preparing an optical lens by injection molding of an optical polymer satisfying an expression (1), $(\eta A-\eta B)/\eta B \times 100 < 60$ (1) where, $\eta A$ is the melt viscosity of the optical polymer measured at a temperature of 290° C. and a shear rate of 200 (l/s), and $\eta B$ is the melt viscosity of the optical polymer measured at a temperature of 290° C. and a shear rate of 2000 (l/s).

10. A method according to claim 9, wherein the optical polymer is a norbornene-based polymer.

* * * * *